United States Patent
Lamb et al.

(10) Patent No.: US 10,359,792 B2
(45) Date of Patent: Jul. 23, 2019

(54) DUAL SET POINT TEMPERATURE SWITCH

(71) Applicant: Rostra Vernatherm, LLC, Bristol, CT (US)

(72) Inventors: Kevin W. Lamb, Naples, FL (US); Alberto D. Medina Santamaria, Bristol, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 16 days.

(21) Appl. No.: 15/592,663

(22) Filed: May 11, 2017

(65) Prior Publication Data
US 2018/0329439 A1    Nov. 15, 2018

(51) Int. Cl.
*G05D 23/275* (2006.01)
*G05D 23/02* (2006.01)
*H01H 37/00* (2006.01)

(52) U.S. Cl.
CPC ..... *G05D 23/27537* (2013.01); *G05D 23/021* (2013.01); *G05D 23/275* (2013.01); *H01H 37/00* (2013.01)

(58) Field of Classification Search
CPC .... G05D 23/02; G05D 23/021; G05D 23/022; G05D 23/023; G05D 23/1852; G05D 23/19; G05D 23/275; G05D 23/27535; G05D 23/27537
See application file for complete search history.

(56) References Cited

U.S. PATENT DOCUMENTS

| | | | |
|---|---|---|---|
| 3,613,041 A * | 10/1971 | Graber | G05D 23/27537 200/284 |
| 4,389,629 A * | 6/1983 | Saur | H01H 37/64 337/126 |
| 6,772,958 B1 | 8/2004 | Lamb et al. | |
| 6,988,364 B1 | 1/2006 | Lamb et al. | |
| 7,469,841 B1 | 12/2008 | Lamb et al. | |
| 7,617,700 B2 | 11/2009 | Lamb et al. | |
| 8,490,885 B2 | 7/2013 | Lamb et al. | |
| 9,133,952 B2 | 9/2015 | Lamb et al. | |
| 9,298,195 B2 | 3/2016 | Lamb et al. | |
| 9,410,536 B2 | 8/2016 | Lamb et al. | |
| 9,690,305 B2 | 6/2017 | Lamb et al. | |

(Continued)

*Primary Examiner* — Jonathan Bradford
(74) *Attorney, Agent, or Firm* — Alix, Yale & Ristas, LLP

(57) ABSTRACT

The temperature switch includes a housing, an actuator, a switch, and a force buffer situated between the actuator and the switch. The switch is movable between a first and second state in response to imposition and release of an actuating force $F_A$. The force buffer transmits the actuating force $F_A$ from the actuator to the switch when compressed a first distance in the first direction by extension of the actuator in response to an increase in temperature $\Delta T_1$. At temperature $T_1$, the force buffer transmits the force $F_A$ to move the switch from the first state to the second state. The actuator retracts a second distance in the second direction in response to a decrease in temperature $\Delta T_2$. At temperature $T_2$, the force buffer releases the force $F_A$ and the switch moves from the second state to the first state.

20 Claims, 2 Drawing Sheets

(56) References Cited

U.S. PATENT DOCUMENTS

| | | |
|---|---|---|
| 2009/0107137 A1 | 4/2009 | Lionello et al. |
| 2010/0032594 A1 | 2/2010 | Lamb et al. |
| 2011/0186763 A1 | 8/2011 | Lamb et al. |
| 2015/0316939 A1 | 11/2015 | Lamb et al. |

* cited by examiner

DUAL SET POINT TEMPERATURE SWITCH

BACKGROUND

Temperature control is a process in which change of temperature of a space, object, liquid, or gas is measured or otherwise detected, and the application or release of heat energy to the space, object, liquid or gas is adjusted to achieve a desired average temperature. Temperature control is important to a variety of equipment and processes, such as the cooling of an internal combustion engine or the temperature of an oven employed to cure a coating or adhesive.

One goal of a temperature control system is to maintain a temperature within a specified range. A temperature control system includes a mechanism for adding or removing heat, a temperature sensing device, and means for actuating the mechanism for adding or removing heat that is responsive to the temperature sensing device. Time delay is inherent in the addition or removal of heat. Temperature sensing devices have some variability. Thermo-mechanical temperature control devices typically respond differently to an increase in temperature than to a drop in temperature, with the difference between the responses referred to as "hysteresis." Mechanically actuated electric switches also have hysteresis between a change of state during actuation and release. Hysteresis in a temperature control system produces different temperatures for control inputs during heating and cooling, resulting in two temperature set points, rather than a single temperature set point. A prior art temperature control switch may employ various means to reduce hysteresis in a temperature control system, to increase the accuracy of temperature control.

Hysteresis is further defined as the lag between an input and an output within a system, based upon previous and instantaneous inputs. In a basic, open loop temperature control, a hysteresis band can be employed such that an actual temperature of a given area is used as an input signal and a change from a first state to a second state of the temperature control is the output. In this system, hysteresis is the difference between the temperature at which a control switch is in a first state and the temperature at which the control switch is in a second state. In a more sophisticated, closed loop temperature control, such as a digital temperature control, the actual temperature is constantly measured by a sensor and feedback is sent to a controller to adjust an output value.

Some processes or systems may require widely separated temperature set points. For these processes or systems, two separate single set point control switches are typically required. In such a system, there is a first switch having a first set point and a second switch having a second set point, which allows for a desired output from two separate set points. However, using two temperature control switches, or a digital temperature control switch, is a less efficient use of space, may require an external power source, wired connections, more moving parts, increased complexity, and includes more modes of failure, all of which make using two temperature control switches, or a digital temperature control switch, more costly than using one basic temperature control switch.

There is a need in the art for a simple, low-cost temperature control switch with few moving parts, no external power source, and few modes of failure that can reliably change states at two widely separated set points.

SUMMARY OF THE INVENTION

In the illustrated embodiment, a dual set point temperature control switch (hereinafter "temperature switch") is disclosed. In the disclosed embodiment, the hysteresis of a thermally responsive wax, a bias member, and a spring biased electric switch are combined and manipulated to produce a temperature switch having two widely separated, pre-determined set points. By combining each hysteresis, the disclosed temperature switch may have a set point differential of greater than 30° Fahrenheit and/or less than 1° Fahrenheit.

The temperature switch includes a housing, a wax-filled actuator, a mechanically activated electric switch, and a force buffer. In response to an increase in temperature, the actuator extends axially in a first direction, going from a first length to a second length. In response to a decrease in temperature, the actuator retracts in a second direction that is opposite the first direction. The switch is movable between a first state and a second state in response to imposition and release of an actuating force $F_A$. The force buffer is situated between the actuator and the switch. The force buffer includes a bias member arranged to compress in response to extension of the actuator in the first direction and to relax in response to retraction of the actuator in the second direction. In the disclosed embodiment, the bias member is a coil spring. The force buffer is selected to transmit the actuating force $F_A$ to the switch when compressed a first distance $D_1$ in the first direction by extension of the actuator in response to a predetermined increase in temperature $\Delta T_1$. At temperature $T_1$, the force buffer transmits the force $F_A$ to move the switch from the first state to the second state; the movement of the switch from the first state to the second state defines a first set point of the temperature switch. The force buffer maintains the actuating force $F_A$ against the switch until the actuator retracts a second distance $D_2$ in the second direction in response to a predetermined decrease in temperature $\Delta T_2$. At temperature $T_2$, the force buffer releases the force $F_A$ and the switch moves from the second state to the first state; the movement of the switch from the second state to the first state defines a second set point of the temperature switch.

In the disclosed embodiment, $\Delta T_1$ and $D_1$ are greater than $\Delta T_2$ and the $D_2$, respectively. This results in switch movement from the first state to the second state at the first set point $T_1$ and switch movement from the second state to the first state at the second set point $T_2$. Here, the second set point $T_2$ is lower than the first set point $T_1$.

In the disclosed embodiment, the actuator comprises a cup defining a reservoir filled with thermally responsive wax. The cup engages a guide having a plug, a piston, a force transfer extension, and a return spring. In response to an increase in temperature $\Delta T_1$, the thermally responsive wax of the actuator expands and exerts force on the plug of the guide. The thermally responsive wax pushes and moves the plug in the first direction. The extension penetrates into the force buffer in the first direction and applies force on the bias member.

In the disclosed embodiment, the bias member of the force buffer is housed within a container having a base and an opening. The base is disposed between the bias member and the switch and the opening is open toward the actuator. The base has a radially outward extending flange that abuts a radially inward protruding shoulder of the housing when the actuator is in a retracted position.

The switch is a microswitch having a common terminal, a normally open terminal, a normally closed terminal, an internal mechanism, and a plunger. At the first set point, the actuating force $F_A$ displaces the plunger and causes the internal mechanism to change from the first state to the second state. At the second set point, the actuating force $F_A$ is removed from the plunger and causes the internal mechanism to change from the second state to the first state.

BRIEF DESCRIPTION OF THE DRAWINGS

Aspects of the preferred embodiment will be described in reference to the drawings, where like numerals reflect like elements.

DETAILED DESCRIPTION

Figure 1:
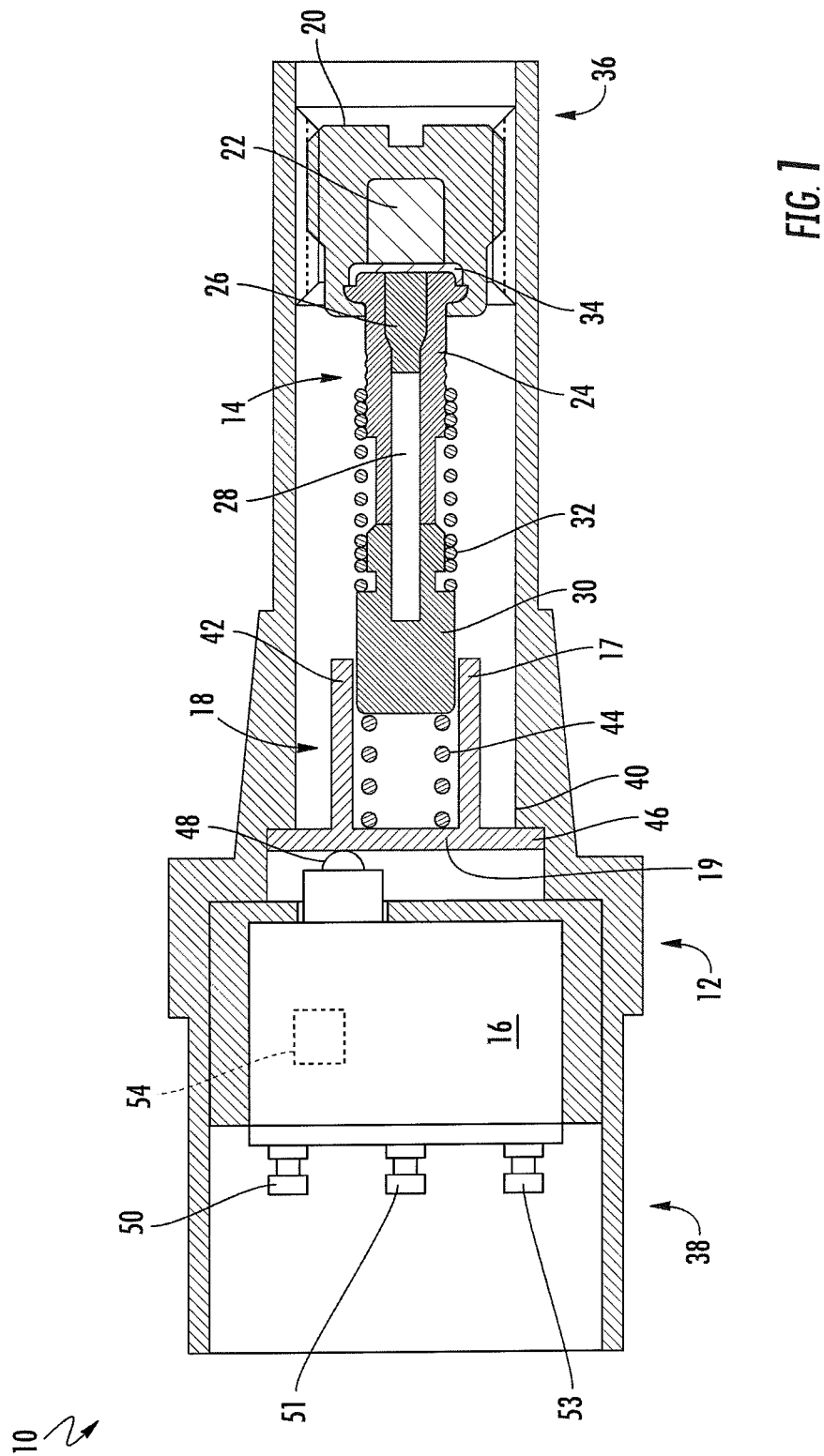
FIG. 1 is a top cross-sectional view of one disclosed embodiment of a temperature switch according to aspects of the disclosure.
Figure 2:
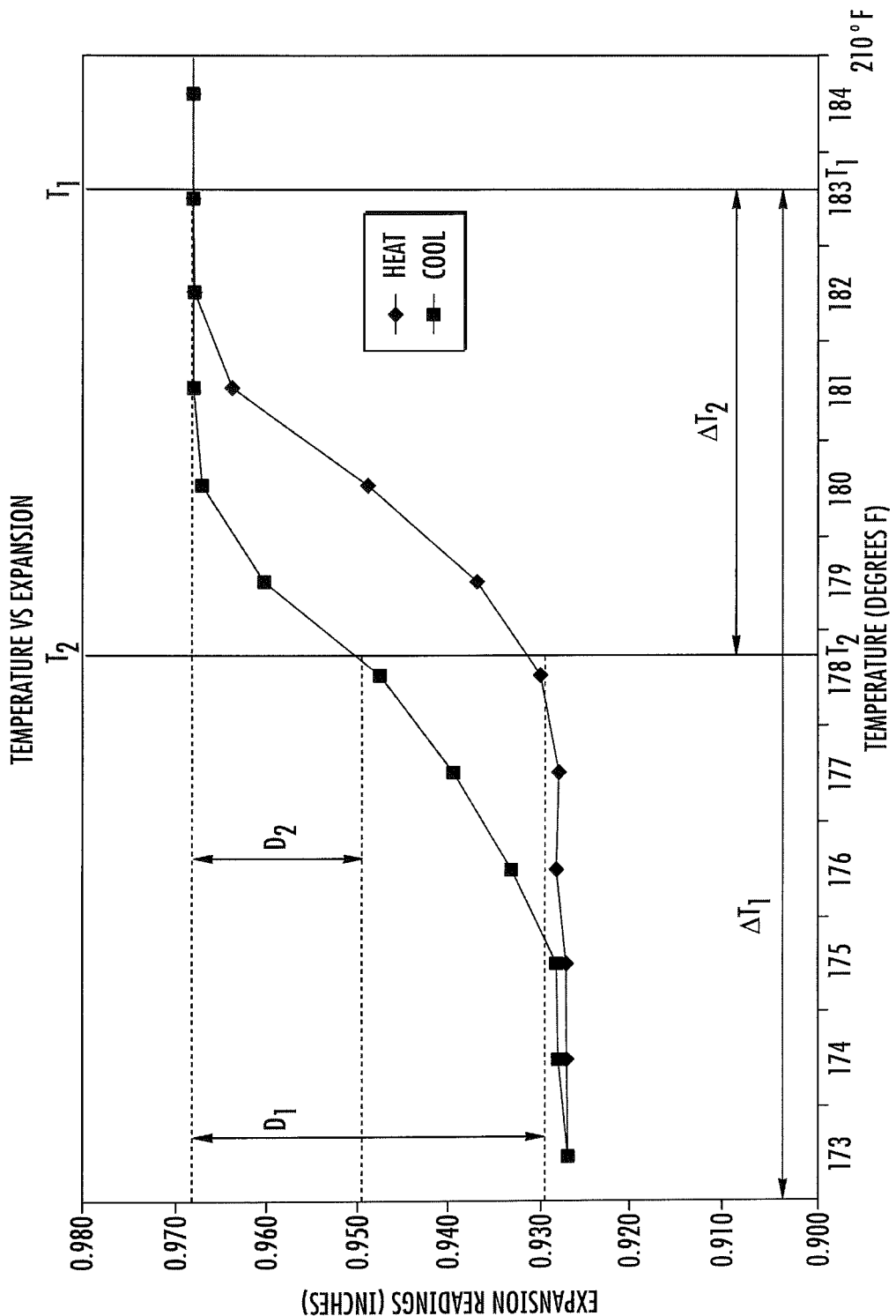
FIG. 2 is a graphical representation of the expansion of a thermally responsive wax of the disclosed embodiment of FIG. 1 in relation to temperature change.

An embodiment of a temperature switch according to aspects of the disclosure will now be described with reference to FIGS. 1-2. The temperature switch will generally be referred to by the reference numeral 10. Various materials, methods of construction, methods of manufacture, and methods of fastening will be discussed in the context of the disclosed embodiment. Those skilled in the art will recognize known substitutes for the materials, manufacturing methods, and fastening methods, all of which are contemplated as compatible with the disclosed embodiment and are intended to be encompassed by the appended claims.

One object of the disclosed temperature switch 10 is to advantageously employ hysteresis in a predetermined manner to establish two widely separated set points for a temperature control switch. The disclosed temperature switch 10 incorporates components and features assembled to increase the differential between first and second temperature set points such that a second control switch is not needed.

With reference to one embodiment, a temperature switch 10 includes a housing 12, a wax-filled actuator 14, a switch 16, and a force buffer 18. The force buffer 18 is configured to receive and transfer force and to protect the switch 16 from damage. The housing has a first end 36, a second end 38, and a radially inward protruding shoulder 40 intermediate the first end 36 and the second end 38. The shoulder 40 is arranged to hold the force buffer 18 in position.

In the first end 36 of the housing 12, the actuator 14 includes a cup 20 defining a reservoir filled with a thermally responsive wax 22 for sensing and responding to temperature change. The first end 36 of the housing 12 may be threaded on its interior and the cup 20 may be threaded on its exterior such that the cup 20 is adjustably fastened to the housing 12. The position of the cup 20 is moveable for calibration. When the position of the cup 20 is calibrated, the first end 36 of the housing 12 is potted with epoxy and sealed so that the position of the cup 20 cannot be tampered with.

The actuator 14 further comprises a guide 24 engaging with an end of the cup 20. A diaphragm 34 contains the thermally responsive wax 22 and seals the joint between the cup 20 and the guide 24. The guide 24 may include a plug 26 for receiving and transferring force from the thermally responsive wax 22, a piston 28 for extending the actuator 14, a force transfer extension 30 for applying force on the force buffer 18, and a return spring 32 for retracting the actuator 14.

The force buffer 18 is intermediate the actuator 14 and the switch 16. The force buffer 18 includes a container 42 having an opening 17 and a base 19. A bias member 44 is positioned within the container 42. In the disclosed embodiment, the bias member 44 is a coil spring. A radially outward extending flange 46 extends from the base 19 and abuts the shoulder 40 of the housing 12 when the actuator 14 is in a retracted position. The extension 30 is partially received by the opening 17 of the container 42. The base 19 of the container 42 is disposed between the bias member 44 and the switch 16. In the disclosed embodiment, the switch 16 is a microswitch. The switch 16 includes a housing, a common terminal 50, a normally open terminal 51, a normally closed terminal 53, an internal mechanism 54, and a plunger 48.

Upon an increase in temperature $\Delta T_1$, the thermally responsive wax 22 begins to expand and interact with the plug 26 of the guide 24. In this interaction between the thermally responsive wax 22 and the plug 26, the thermally responsive wax 22 exerts force on the plug 26 and moves the plug 26 in a first direction toward the second end 38 of the housing 12. The plug 26 pushes the piston 28 in the first direction. The piston 28 extends the extension 30 in the first direction. The extension 30 penetrates the container 42 of the force buffer 18 and compresses the bias member 44. At a temperature $T_1$, the bias member 44 is in a compressed position and a force $F_A$ is transmitted from the force buffer 18 to the plunger 48 of the switch 16. The transmission of the force $F_A$ from the force buffer 18 to the plunger 48 moves the internal mechanism 54 from a first state to a second state.

Movement from the first position of contact with the normally closed terminal 53 to the second position of contact with the normally open terminal 51 causes the switch 16 to move from the first state to the second state and actuate the temperature switch 10. Alternatively, the switch 16 may be arranged such that in the first state before reaching temperature $T_1$, the internal mechanism 54 may be in contact with the normally open terminal 51. In this arrangement, displacing the plunger 48 causes the internal mechanism 54 to move into contact with the normally closed terminal 53 and result in actuation of the temperature switch 10. In either arrangement, once configured, the second end 38 of the housing 12 is also potted with epoxy and sealed so that the switch 16 cannot be altered.

When the temperature decreases toward a temperature $T_2$, the thermally responsive wax 22 retracts and reduces its exertion of force on the plug 26. The reduction of force causes the plug 26 to retract in a second direction away from the force buffer 18. The movement of the plug 26 in the second direction causes the piston 28, the force transfer extension 30, and the return spring 32 to retract and move in the second direction. Retraction and movement in the second direction relieves compression of the bias member 44. At temperature $T_2$ the force transfer extension 30 no longer exerts force $F_A$ on the force buffer 18. The internal mechanism 54 may move from contact with the normally open terminal 51 to the normally closed terminal 53 and move the switch 16 from the second state to the first state.

What is claimed:

1. A dual set point temperature switch comprising:
   a housing;
   an actuator positioned within the housing, the actuator including a cup filled with thermally responsive wax, the actuator responsive to an increase in temperature $\Delta T_1$ extending said actuator in a first direction, the actuator responsive to a decrease in temperature $\Delta T_2$ retracting the actuator in a second direction opposite said first direction;
   a switch movable between a first state and a second state in response to an actuating force $F_A$;
   a force buffer situated between the actuator and said switch, the force buffer including a bias spring compressing in response to movement of the actuator in said first direction and to relax in response to movement of the actuator in said second direction, the bias spring selected to transmit the actuating force $F_A$ to said switch when compressed a first distance $D_1$ in the first direction by extension of said actuator in response to a pre-determined increase in temperature $\Delta T_1$, thereby moving the switch from the first state to the second state at temperature $T_1$ and maintaining the actuating force $F_A$ against said switch until the actuator retracts a second distance $D_2$ in said second direction in response to a pre-determined decrease in temperature $\Delta T_2$, wherein, $\Delta T_1$ and $D_1$ are greater than $\Delta T_2$ and $D_2$, resulting in switch movement from said first state to said second state at $T_1$ and switch movement from said second state to said first state at a second temperature $T_2$, wherein $T_2$ is lower than $T_1$, wherein, the position of the cup is axially adjustable relative to the housing to calibrate $T_1$ and $T_2$.

2. The dual set point temperature switch of claim 1, wherein said cup defines a reservoir filled with the thermally responsive wax, said cup engaging a guide comprising a plug, a piston, a force transfer extension and a return spring.

3. The dual set point temperature switch of claim 2, wherein upon the increase in temperature $\Delta T_1$ the thermally responsive wax of said actuator begins to expand and interact with the plug of said guide, the thermally responsive wax pushes the plug in said first direction extending the extension in said first direction and the extension penetrates further into the force buffer in said first direction and applies the force $F_A$ on said bias spring.

4. The dual set point temperature switch of claim 1, wherein the bias spring of said force buffer is housed within a container having a base and an opening, the base being disposed between the bias spring and said switch and the base having a radially outward extending flange.

5. The dual set point temperature switch of claim 4, wherein the flange abuts a radially inward protruding shoulder when said actuator is in a retracted position.

6. The dual set point temperature switch of claim 1, wherein the bias spring of said force buffer is a coil spring.

7. The dual set point temperature switch of claim 1, wherein the switch is a microswitch comprising a common terminal, a normally open terminal, a normally closed terminal, an internal mechanism and a plunger.

8. The dual set point temperature switch of claim 7, wherein the actuating force $F_A$ displaces the plunger causing said internal mechanism to move from contact with the normally closed terminal to contact with the normally open terminal and said contact with the normally open terminal causes said dual set point temperature switch to change state.

9. A dual set point temperature switch comprising:
a housing;
a switch disposed within the housing movable from a first state to a second state in response to an actuating force $F_A$;
an actuator positioned within the housing, the actuator including a cup defining a reservoir filled with thermally responsive wax and a guide comprising a plug, a piston, a force transfer extension and a return spring, an exterior of the cup adjustably fastening to an interior of the housing;
a force buffer comprising a bias spring housed within a container having a base and an opening,
wherein, the force buffer is intermediate the switch and said actuator, the thermally responsive wax of said actuator responds to an increase in temperature $\Delta T_1$ and expands causing the actuator to extend in a first direction compressing the bias spring of said force buffer, at temperature $T_1$ the force buffer applies the force $F_A$ on the switch moving said switch from the first state to the second state, wherein, the position of the cup is axially adjustable relative to the housing to calibrate $T_1$.

10. The dual set point temperature switch of claim 9, wherein upon said increase in temperature $\Delta T_1$ the thermally responsive wax of said actuator begins to expand and interact with the plug of said guide, wherein the thermally responsive wax pushes the plug in said first direction extending the extension in said first direction, wherein the extension penetrates further into the force buffer in the first direction and applies said force $F_A$ on the bias spring.

11. The dual set point temperature switch of claim 9, wherein the housing includes threads on an interior and the cup of said actuator includes threads on an exterior, the cup being adjustably fastened to said housing.

12. The dual set point temperature switch of claim 9, wherein the switch is a microswitch comprising a common terminal, a normally open terminal, a normally closed terminal, an internal mechanism and a plunger, the actuating force $F_A$ displaces the plunger causing said internal mechanism to move from contact with the normally closed terminal to contact with said normally open terminal and the contact with the normally open terminal causes the temperature switch to change state.

13. A dual set point temperature switch comprising:
a housing having a first end and a second end;
an actuator disposed within the housing, the actuator including a cup filled with thermally-responsive wax for actuating a switch, an exterior of the cup having threads for adjustably fastening to complementary threads on an interior of the housing, said first and second ends of the housing being potted and sealed;
the switch movable from a first state to a second state;
a force buffer intermediate said actuator and said switch,
wherein, said actuator responds to an increase in temperature $\Delta T_1$ and extends in a first direction, extension in the first direction applies force on the force buffer and at temperature $T_1$ the force buffer transmits an actuating force $F_A$ on the switch moving said switch from the first state to the second state, wherein, the position of the cup is axially adjustable relative to the housing to calibrate $T_1$ and after calibration of $T_1$ the first and second ends of the housing are potted and sealed so that the position of the cup is no longer axially adjustable.

14. The dual set point temperature switch of claim 13, wherein the actuator comprises a cup defining a reservoir filled with thermally responsive wax, said cup engaging a guide comprising a plug, a piston, a force transfer extension and a return spring.

15. The dual set point temperature switch of claim 13, wherein the force buffer includes a bias spring intermediate the actuator and the switch.

16. The dual set point temperature switch of claim 13, wherein the force buffer includes a coil spring within a container having an opening and a base, said base having a radially outward extending flange.

17. The dual set point temperature switch of claim 13, wherein said thermally responsive wax responds to an increase in temperature $\Delta T_1$ extending said actuator in the first direction, the actuator applying said force on the force buffer causing the bias spring to compress and transmit said force to a plunger of the switch and at temperature $T_1$ the force buffer applying said force $F_A$ on the plunger moving said switch from the first state to the second state.

18. The dual set point temperature switch of claim 13, wherein said thermally responsive wax responds to a decrease in temperature $\Delta T_2$ retracting the actuator in a second direction, at temperature $T_2$ said force buffer no longer transmits the force $F_A$ and said switch moves from said second state to said first state.

19. The dual set point temperature switch of claim 1, wherein after calibration of $T_1$ and $T_2$ the housing is potted and sealed so that the position of the cup is no longer axially adjustable.

20. The dual set point temperature switch of claim 9, wherein after calibration of $T_1$ the housing is potted and sealed so that the position of the cup is no longer axially adjustable.

* * * * *